(12) United States Patent
Ferrell et al.

(10) Patent No.: US 11,755,339 B1
(45) Date of Patent: *Sep. 12, 2023

(54) DISAGGREGATED CLOUD-NATIVE NETWORK ARCHITECTURE

(71) Applicant: Infoblox Inc., Santa Clara, CA (US)

(72) Inventors: Phillip Ferrell, Mountain View, CA (US); Prasanna Kumar Krishnamurthy, San Jose, CA (US); Vidyasagara Reddy Guntaka, San Jose, CA (US); Venkat Dabbara, Pleasanton, CA (US); Suresh Vobbilisetty, San Jose, CA (US); Himanshu Varshney, San Jose, CA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,167

(22) Filed: Aug. 29, 2022

Related U.S. Application Data

(63) Continuation of application No. 17/322,680, filed on May 17, 2021, now Pat. No. 11,461,114, which is a
(Continued)

(51) Int. Cl.
*H04L 12/00* (2006.01)
*G06F 9/445* (2018.01)
(Continued)

(52) U.S. Cl.
CPC ........... *G06F 9/44505* (2013.01); *G06F 8/65* (2013.01); *H04L 67/10* (2013.01)

(58) Field of Classification Search
CPC ....... H04L 67/10; G06F 8/65; G06F 9/44505; G06F 9/45558; G06F 9/45512; G06F 2009/45591
(Continued)

(56) References Cited

U.S. PATENT DOCUMENTS 8,971,173 B1  3/2015  Choudhury
9,686,732 B2*  6/2017  Russell ................. H04W 40/20
(Continued)

OTHER PUBLICATIONS

Anonymous, Concepts—Kubernetes, Oct. 3, 2018, Retrieved from the Internet, URL web.archive.org/web/20181003095005/kubernetes.io/docs/concepts/.
(Continued)

*Primary Examiner* — Frantz Coby
(74) *Attorney, Agent, or Firm* — Van Pelt, Yi & James LLP

(57) ABSTRACT

A cloud based network includes a plurality of nodes, each of which include at least one containerized microservice that enables intent-driven operation of the cloud based network. One or more resource controllers, each designated to manage a custom resource, communicate with a master controller of the node to manage operational and configuration states of the node and any microservices containerized within the node. The master enables a user to monitor and automate the management of microservices and the cloud based network as a whole. The containerized microservice architecture allows user customizable rendering of microservices, reconciliation of old and new versions of microservices, and facilitated management of a plurality of nodes.

18 Claims, 11 Drawing Sheets

Related U.S. Application Data continuation of application No. 16/663,094, filed on Oct. 24, 2019, now Pat. No. 11,036,521.

(60) Provisional application No. 62/880,268, filed on Jul. 30, 2019, provisional application No. 62/850,810, filed on May 21, 2019, provisional application No. 62/805,931, filed on Feb. 14, 2019, provisional application No. 62/753,792, filed on Oct. 31, 2018.

(51) Int. Cl.
    *G06F 8/65*     (2018.01)
    *H04L 67/10*     (2022.01)

(58) Field of Classification Search
    USPC .................................................. 709/223–226
    See application file for complete search history.

(56) References Cited

U.S. PATENT DOCUMENTS

| | | | |
|---|---|---|---|
| 9,716,612 B2 | 7/2017 | Bailey | |
| 9,912,582 B2* | 3/2018 | Pourzandi | H04L 41/40 |
| 10,348,838 B2 | 7/2019 | Yang | |
| 10,389,642 B2 | 8/2019 | Raney | |
| 10,474,380 B2 | 11/2019 | Herrell | |
| 11,036,521 B2* | 6/2021 | Ferrell | G06F 9/44505 |
| 11,461,114 B2* | 10/2022 | Ferrell | G06F 9/45512 |
| 2013/0166713 A1 | 6/2013 | Chiu | |
| 2014/0101652 A1 | 4/2014 | Kamble | |
| 2015/0139238 A1 | 5/2015 | Pourzandi | |
| 2015/0304281 A1* | 10/2015 | Kasturi | H04L 41/0895 |
| | | | 726/1 |
| 2015/0341377 A1* | 11/2015 | Kasturi | G06F 16/955 |
| | | | 726/23 |
| 2016/0087847 A1 | 3/2016 | Krithivas | |
| 2017/0149894 A1 | 5/2017 | Liang | |
| 2017/0250948 A1 | 8/2017 | Rune | |
| 2018/0046338 A1 | 2/2018 | Breakstone | |
| 2018/0046514 A1 | 2/2018 | Breakstone | |
| 2018/0062923 A1 | 3/2018 | Katrekar | |
| 2018/0159722 A1 | 6/2018 | Soma Reddy | |
| 2018/0241842 A1 | 8/2018 | Kumar | |
| 2018/0287902 A1* | 10/2018 | Chitalia | G06F 11/3433 |
| 2018/0300259 A1 | 10/2018 | Shih | |
| 2019/0238636 A1 | 8/2019 | Li | |
| 2019/0324431 A1 | 10/2019 | Cella | |
| 2020/0159630 A1 | 5/2020 | Chen | |

OTHER PUBLICATIONS

Anonymous, Custom Resources—Kubernetes, Oct. 3, 2018, Retrieved from the Internet, URL:web.archive.org/web/20181003161327/kubernetes.io/docs/concepts/extend-kubernetes/api-extension/custom-resources/.

Anonymous, Nodes—Kubernetes, Oct. 3, 2018, Retrieved from the Internet, URL: /web.archive.org/web/20181003095011mp_/kubernetes.io/docs/concepts/architecture/nodes.

Vayghan et al., Deploying Microservice Based Applications with Kubernetes: Experiments and Lessons Learned, 2018 IEEE 11th International Conference on Cloud Computing, pp. 970-973.

* cited by examiner

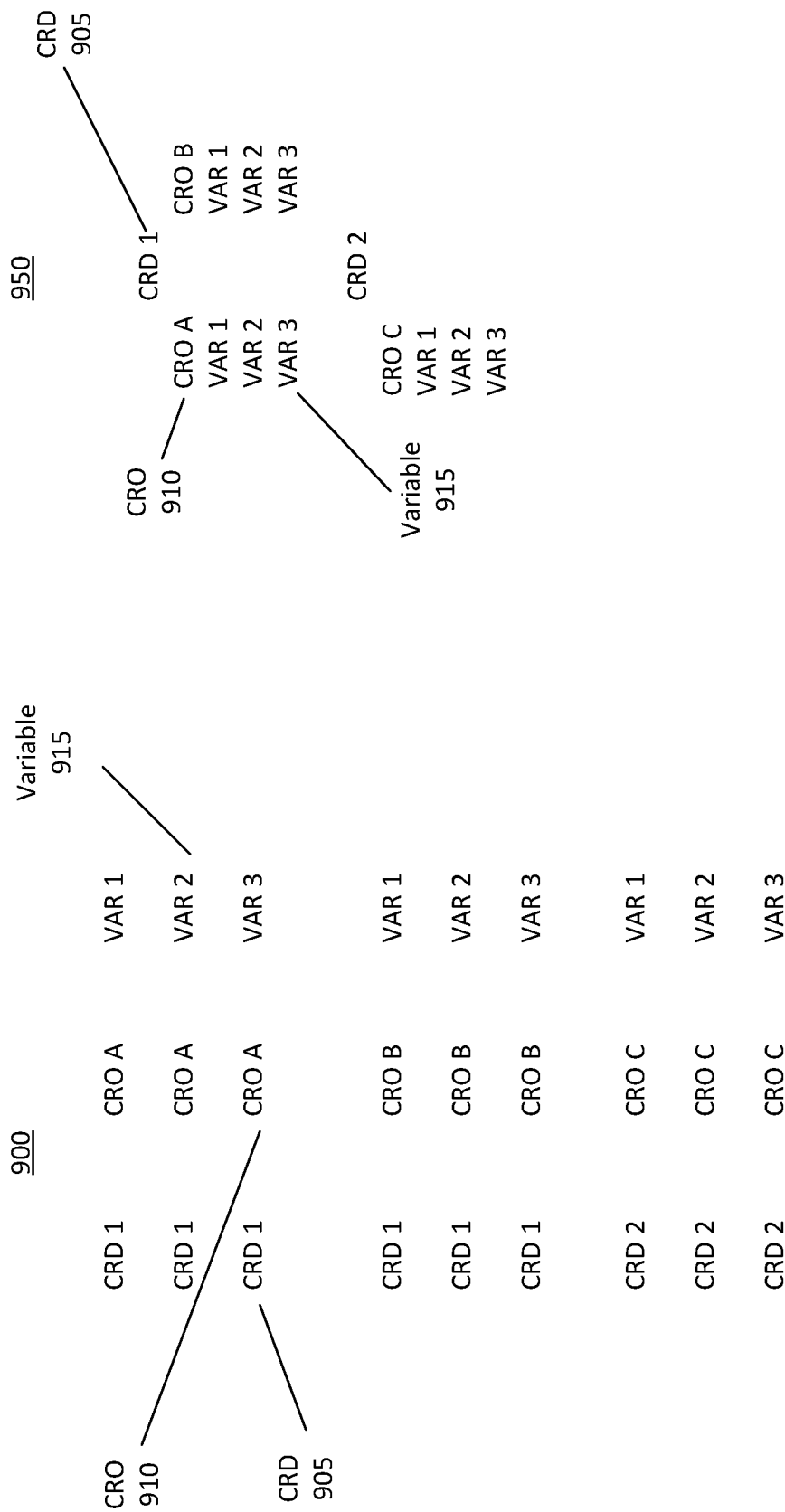

DISAGGREGATED CLOUD-NATIVE NETWORK ARCHITECTURE

CROSS-REFERENCE TO RELATED APPLICATIONS

This application is a continuation of U.S. patent application Ser. No. 17/322,680, entitled DISAGGREGATED CLOUD-NATIVE NETWORK ARCHITECTURE filed May 17, 2021, which is incorporated herein by reference for all purposes, which is a continuation of U.S. patent application Ser. No. 16/663,094, entitled DISAGGREGATED CLOUD-NATIVE NETWORK ARCHITECTURE filed Oct. 24, 2019, now U.S. Pat. No. 11,036,521, which claims the benefit of each of U.S. Provisional Application No. 62/880,268, filed Jul. 30, 2019; U.S. Provisional Application No. 62/850,810, filed May 21, 2019; U.S. Provisional Application No. 62/805,931, filed Feb. 14, 2019; and U.S. Provisional Application No. 62/753,792, filed on Oct. 31, 2018, each of which are incorporated by reference in their entirety.

FIELD OF THE DISCLOSURE

The present disclosure relates to the field of cloud based computer networking.

BACKGROUND

Computer networking systems connect and enable data transfer between a plurality of client devices. Existing networking solutions are insufficient to keep up with the rapid growth of cloud based applications and data processing. Therefore, there is a need for more flexible, scalable, and efficient cloud based network architecture solutions.

SUMMARY

A cloud based network includes a microservices based application architecture, in which a plurality of nodes within a network cluster each house at least one microservice. The cloud based network allows for the automation of individual microservices, nodes, and clusters, providing increased visibility, ease of monitoring, and increased control of the network.

The cloud based network includes a plurality of nodes, wherein each node includes a master controller, one or more custom controllers, and one or more containerized microservices. The master controller manages the one or more custom controllers, which are configured to access and store custom resources that indicate an operational state of the node, a configuration state of the node, and a set of telemetry data representative of the node. At least one of the custom controllers manages the one or more containerized microservices. The cloud based network also enables user customizable rendering of custom resources and dynamic updates to a command line interface (CLI) shell that displays the custom resources.

At least one custom controller can be configured to reconcile a desired operational and configuration state of the node with an existing operational and configuration state of the node, respectively. Similarly, the master controller can be configured to reconcile different versions of a plurality of microservices, thus enabling smooth functionality of the node during an update.

The plurality of nodes of the cloud based network may be distributed through a plurality of clusters, each of which can be controlled by a master controller located in an external network cluster. A fabric controller can control the multi-cluster cloud based network, wherein the fabric controller monitors, manages, and accesses each of the nodes within each cluster.

BRIEF DESCRIPTION OF THE DRAWINGS

FIG. 9A illustrates a model driven output of rendered CRDs without templating, in accordance with one or more embodiments.

FIG. 9B illustrates a templated output of the CRDs shown in FIG. 9A, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A cloud based network provides containerized network services to users via microservices within each node of the network. Users may integrate their own networking devices with commercial cloud service providers via the cloud based network architecture described herein. Accordingly, users maintain visibility and control over their cloud based network system while automating network services. The cloud based network may further assist in unifying users' network operations with software development and quality assurance.

Figure 1:
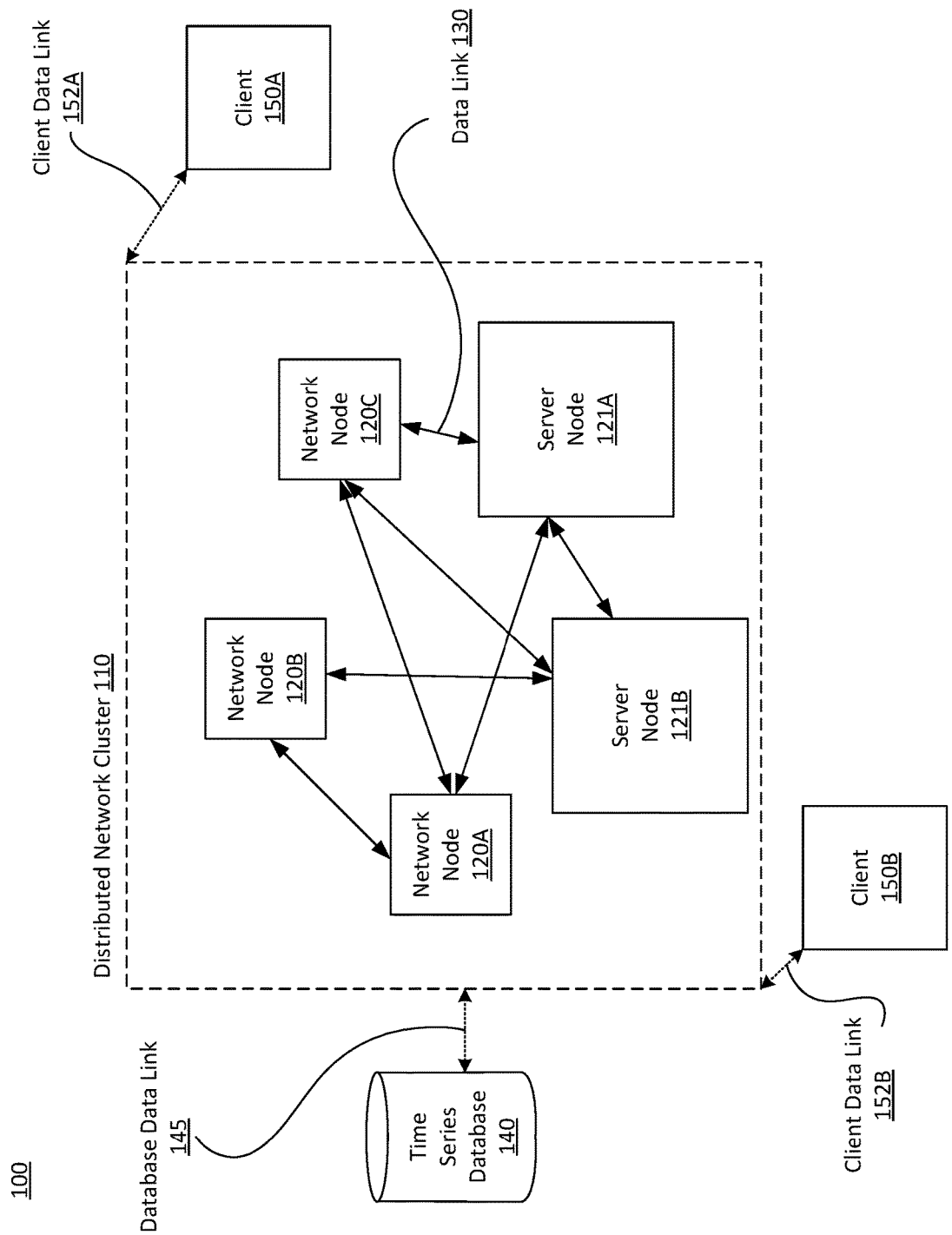
FIG. 1 illustrates a cloud based network, in accordance with one or more embodiments.

FIG. 1 illustrates a cloud based network 100, in accordance with one or more embodiments. The cloud based network 100 enables data packet forwarding between devices. The cloud based network 100 includes a distributed network cluster ("cluster") 110, a timeseries database 140, and clients 150A, 150B. The times series database 140 connects to the cluster 110 via a database data link 145; the clients 150A, 150B connect to the cluster via a client data link 152A, 152B, respectively. The cloud based network 100 may include other components than those shown in FIG. 1, such as additional network nodes and/or client devices, for example.

The distributed network cluster 110 includes a plurality of network nodes 120A, 120B, 120C, and in some embodiments, a plurality of server nodes 121A, 121B. The network nodes 120A-C and the server nodes 121A-B are collectively referred to as "nodes," and connect to one another via one or more data links 130. As described in greater detail below with reference to FIG. 2, the nodes 120A-C, 121A-B in the cluster 110 run and/or support one or more network services, establishing a cloud based network operating system.

Examples of network nodes 120A-C include network routers, switches, or some combination thereof. Server nodes 121A-B may be, for example, server computers. The cloud based network enables packet forwarding via hardware components and/or software components. In some embodiments, the cloud based network is deployed on server nodes 121A-B via software and on network nodes 120A-C via hardware. In some embodiments, the cloud based network is deployed on a majority or all of the nodes 120A-C, 121A-B within the cluster 110 via software.

The nodes 120A-C, 121A-B within the cluster 110 may operate individually as well as via distributed consensus. Each of the nodes 120A-C, 121A-B include a master component (not shown in FIG. 1) that manages the respective node's operation. In some embodiments, the master components of all the nodes 120A-C, 121A-B within the cluster 110 work together to enable collective operation and synchronization within the cluster. The nodes 120A-C, 121A-B may use an algorithm such as the Raft consensus, Paxos, or Delegated Byzantine Fault Tolerance ("dBFT"), or some combination thereof in order to manage and coordinate the operation of the nodes 120A-C, 121A-B.

Connections such as the data link 130, the database data link 140 and the client data links 152A-B allow communicative coupling within the cloud based network 100. For example, connections may be established over cable media such as wires or optic cables, or wireless media such as WiFi. The clients 150A-B may connect to nodes 120A-C, 121A-B in the cluster 110 via ports at some or all of the nodes 120A-C, 121A-B.

The timeseries database 140A stores sequential time stamped data. The time stamped data may include, for example, measurements of a configuration and/or operational state of a node within the cluster 110 taken at 60 second intervals. The timeseries database 140 receives and stores timeseries data from the nodes 120A-C, 121A-B. In some embodiments, users of the cloud based network 100 may query the time-series database 140 to perform analytics on an operational state and/or configuration state of the cluster 110 and its nodes 120A-C, 121A-B, as well as network services operating within the cluster 110. Timeseries data in the time-series database 140 may be used as part of a cluster 110 control loop, which may be used to check for irregular spikes in network traffic as compared to historic rates, for example.

The clients 150A-B use network services provided by the distributed network cluster 110. The clients 150A-B are electronic devices such as smartphones, laptops, personal computers, and servers, for example, that may use network protocols such as Border Gateway Protocol ("BGP").

Figure 2:
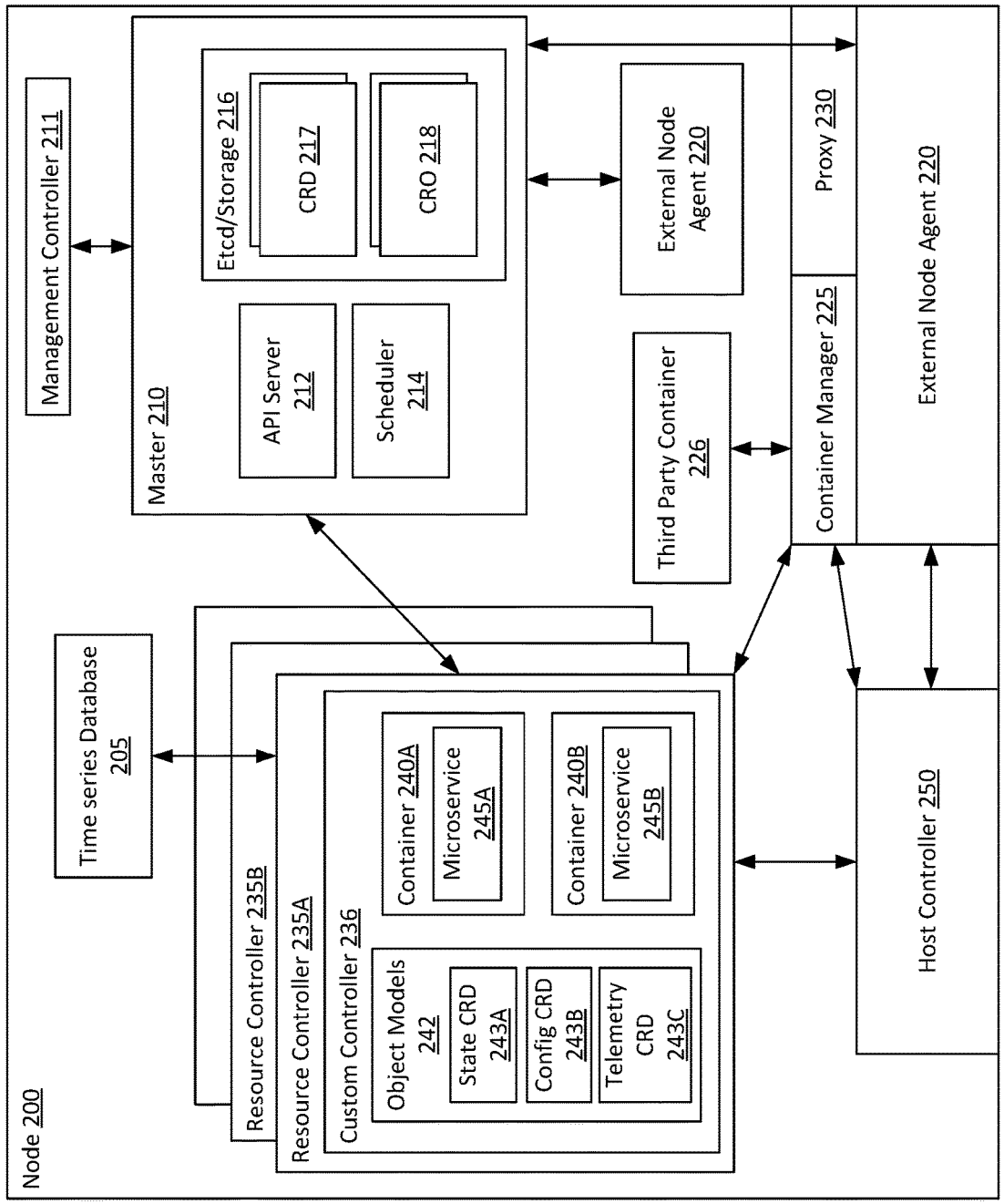
FIG. 2 illustrates a node within the cloud based network shown in FIG. 1, in accordance within one or more embodiments.

FIG. 2 illustrates a node 200 within the cloud based network 100 shown in FIG. 1, in accordance within one or more embodiments. Each of the nodes 120A-C, 121A-B of FIG. 1 is an embodiment of the node 200. The node 200 includes a timeseries database 205, a master controller ("master") 210, a management controller 211, one or more external node agents 220, a third party container 226, a host controller 230, one or more resource controllers 235A, 235B, and one or more custom controllers 236. In some embodiments, the node 200 may include components other than those shown in FIG. 2.

The timeseries database 205 records timeseries data on one or more states of the node 200. For example, in one embodiment, the timeseries database 205 receives data on a configuration state, an operational state, and telemetry of the node 200. The timeseries database 205 provides recorded data to the timeseries database 140 of FIG. 1. Users may query the timeseries database 205 to determine a state of the node 200.

The master 210 manages one or more states of the node 200. The master 210 includes an application programming interface ("API") server 212, a scheduler 214, and a storage 216. The master 210 is connected to the management controller 211, which provides a command line interface ("CLI") that a user, such as a network engineer, may use to interact with the master 210, the node 200, the cluster 110, or some combination thereof. The CLI is discussed in further detail with respect to FIG. 5.

The API server 212 validates and configures data for API objects that represent the state of the node 200 within the cloud based network 100. API objects are based on API functions and conform to particular object models. For example, an API object may indicate a configuration state as set by a user of the cloud based network 100. Different API objects may represent different containerized microservices, various resources, and policies, such as restart policies, upgrades, fault-tolerances, and so on. In some embodiments, other components of the node 200 use API objects to perform declarative automation, forming control loops to maintain various states, such as an operational state and configuration state of the node 200. The API server 212 may register new microservices and subsequently determine and/or derive a set of CROs representing instantiations of the CRDs of newly registered microservices. In some embodiments, the API server 212 services representational state transfer ("REST") operations and provides a front end to both the node's 200 state and the cluster's 110 overall state. Users may interact with the front end provided by the management controller 211 to enforce changes upon the configuration, and therefore operation, of the node 200 and/or cluster 110, or to monitor activity, i.e. the operational state, within the cluster 110.

The scheduler 214 manages scheduling for containerized microservices across a plurality of nodes, such as the node 200, within the cluster 110. The containerized microservices may be coupled to one another within a container, such as the container 240A described below. In some embodiments, a plurality of coupled microservices may be referred to as a pod. The scheduler 214 accounts for individual and collective resource requirements of a newly created pod, hardware, software, and policy constraints of the newly created pod and/or nodes within the cluster 110, affinity and anti-affinity specifications, data locality, inter-workload interference, and deadlines. The scheduler 214 operates in conjunction with the schedulers 214 of the other nodes, similar to the node 200, in the cluster 110 to reach consensus upon scheduling tasks. For example, the schedulers 214 of each node in the cluster 110 operate in conjunction to decide which node in which to deploy a pod.

The storage 216 stores one or more custom resource descriptions ("CRD") 217, which are templates for custom resources, and one or more custom resource objects ("CRO") 218, which are operational instantiations of CRDs 217. Custom resources are data object models that represent the data structure of a microservice or other software component. The node 200 may read and write to the storage 216. In some embodiments, the storage 216 is external to the node 200, in which case the master 210 establishes a standard storage interface through which various components of the node 200 can access the storage 216. The node 200 may access the storage 216 in real-time and on demand. In some embodiments, the master 210 includes more than one storage. For example, one storage may include a primary memory, such as random access memory ("RAM"), and a second storage may include a secondary memory, such as a hard drive. In an embodiment, the storage 216 is an etcd, which is a distributed key value store.

The external node agent 220 maintains containerized microservices running on the node 200 as per a configuration provided by the master 210. The master 210 provides the configuration via at least one CRD 217. In some embodiments, the external node agent 220 does not maintain, but can communicate with, one or more third party containers 226. The node 200 may include a plurality of external node agents 220. The external node agent 220 may be a Kubelet, for example. The external node agent 220 is connected to a container manager 225 and a proxy 250. The container manager 225 is a container engine, such as DOCKER, used to perform containerization of microservices within the node. The external node agent 220 uses the container manager 225 to maintain containers 240 within the microservices running upon the node 200. The container manager 225 is also connected to one or more third party containers 226 or other third party software and is used by the one or more third party containers 226 or software to perform containerization.

The proxy 230 is a server that enables packet forwarding within the node 200. The proxy 230 can proxy User Datagram Protocol ("UDP"), Transmission Control Protocol ("TCP") and Stream Control Transmission Protocol ("SCTP"), to perform stream forwarding or round robin forwarding. For example, the proxy 230 may be a kube proxy. In other embodiments, additional proxies similar to the proxy 230 that perform other proxy services may be included in the node 200. For example, the node 200 may include a kubectl proxy, an API Server proxy, and so on, for various purposes, such as to proxy Hypertext Transfer Protocol ("HTTP").

The resource controllers 235A-B manage and contain resources of the node 200. Each of the resource controllers 235A-B includes at least one custom controller 236, the custom controller 236 configured to manage one or more containerized microservices 245A-B. In some embodiments, the node 200 includes more resource controllers and/or custom controllers than those shown in FIG. 2.

The resource controllers 235A-B have access to the one or more custom controllers 236, and therefore the microservices, that they each manage. In some embodiments, the resource controllers 235A-B may discover and/or instantiate new microservices, and subsequently present them to the API server 212 of the master 210 for registration and use within the node 200. Accordingly, the master 210 provides the resource controllers 235A-B with a desired configuration state of the node 200 and facilitate the configuration of new microservices registered within the node 200 to reach the desired configuration state. The resource controllers 235A-B also manage the operation of the microservices in accordance with desired operational states of the node 200 received from the master 210.

The custom controller 236 enables access to custom resources and manages the containerized microservices 245A-B within the node 200. The custom controller 236 includes object models 242, including an operational state CRD 243A, a configuration state CRD 243B, and a telemetry state CRD 243C, as well as one or more containers 240A-B which contain the microservices 245A-B. The operational state CRD 243A is a data object representing an actual runtime state of the cloud based network 100, the configuration state CRD 243B represents a desired state of the cloud based network 100, and the telemetry CRD 243C represents analytics of the operation of the cloud based network 100. In some embodiments, a dependency order among a plurality of the CRDs 243A-C associated with a microservice may determine the functionality of a network service. The API server 212 may relay the order in which the CRDs and CROs are registered and deployed to account for the dependency order. For example, the dependency order may be annotated within the CRD of the microservice.

The custom controller 236 includes various functions and logic for interacting with the custom resources controlled by the custom controller 236. For example, the custom controller 236 may include "create", "read", "update", and "delete" ("CRUD") functions particular to the data structure of the custom resource controlled by the custom controller 236. The custom controller 236 may extend these functions to the API server 212, adding them to the API and enabling user interaction with the custom resources.

The custom controller 236 enables control loops that regularly observe the state of the one or more microservices 245A-B and/or the containers 240A-B, as well as the object models 242. The custom controller 236 may also modify the current state of the microservices 245A-B and/or the containers 240A-B to the desired state as specified by the object models 242. For example, a custom resource defined by the object models 242 may extend the API for a particular microservice 245A within the domain of the custom controller 236A, and the custom controller 236A may control the microservice 245A based on functions of the custom controller 236.

The microservices 245A-B are distributed software components of an application that work with one another to provide the functionality of the application. The microservices 245A-B enable a user to perform one or more intent driven operations within the cloud based network 100. A complete networking operating system can execute a number of intent driven operations. In some embodiments, the microservices may manage different layers of a network protocol stack. For example, the microservice 245A may manage BGP, Open Shortest Path First ("OSPF"), Intermediate System to Intermediate System ("IS-IS"), Spanning Tree Protocol ("STP"), and Link Aggregation Control Protocol ("LACP"), among other network protocol stack layers. In other embodiments, the microservices 245A-B may be new cloud-native networking operating system services, such as service discovery or side-car services.

The microservices 245A-B operate within the containers 240A-B. As described above, the container manager 225 manages the containers 240A-B within the node 200. The containers 240A-B are each individual and executable packages of software that include the dependencies, such as libraries, necessary for the microservices 245A-B included in the container to function independently of outside resources (apart from the node's 200 operating system). The containers 240A-B are a virtualization mechanism at the operating system level, and multiple containers share a kernel of the operating system of the node 200.

The host controller 250 is a daemon that manages control loops within the node 200. Each control loop is based on the logic of a controller, and is used to modify an operational state to a configuration state, or to perform one or more functions within the node 200 or cluster 110. The host controller 250 interacts with the resource controllers 235A-B and the custom controller 236 to maintain the control loops operating within the resource controllers 235A-B and the custom controller 236, respectively. With multiple resource controllers 235A-B, the host controller 250 may enable multiple control loops corresponding to different resources. In some embodiments, the host controller 250 is configured to automatically instantiate the master 210, the resource controllers 235A-B, and the custom controller 236. In some embodiments, the host controller receives instructions to instantiate one or more controllers from another node, a network operator, a fabric controller, or any other suitable entity.

Monitoring Changes in the Cloud Based Network

Figure 3:
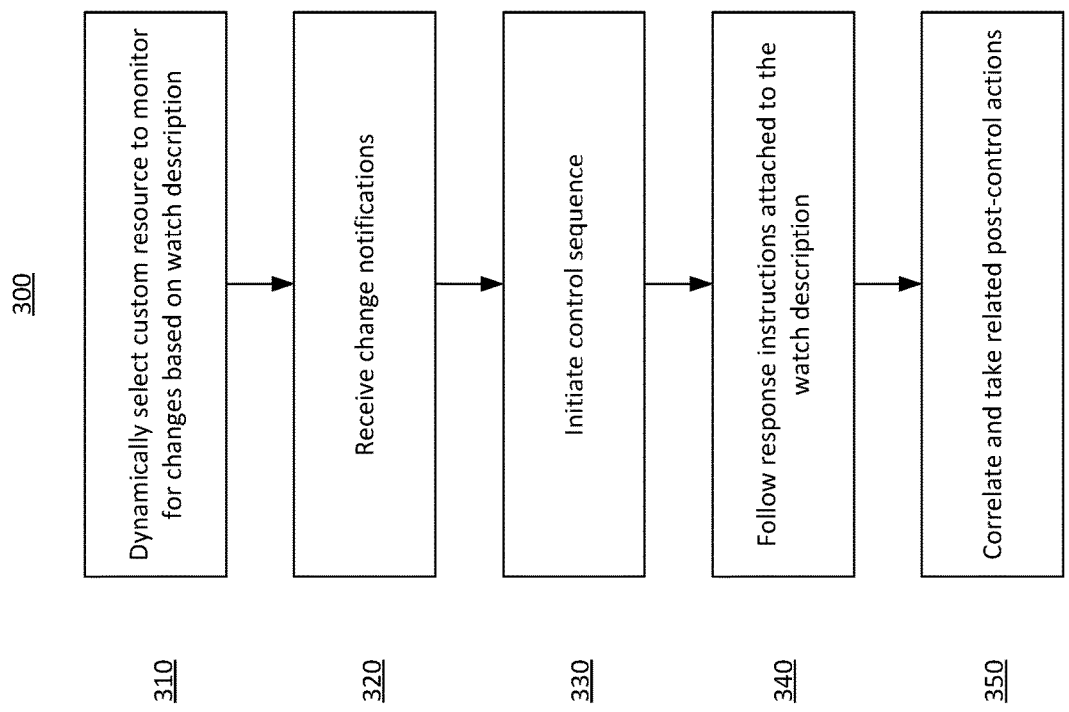
FIG. 3 illustrates a method for monitoring changes within a cloud based network, in accordance with one or more embodiments.

FIG. 3 illustrates a method 300 for monitoring changes within a cloud based network 100, in accordance with one or more embodiments. Within the node 200, the master 210 dynamically selects 310 a custom resource to monitor for changes based on a watch description. For example, the master 210 may receive a watch description from a user, which then instructs the host controller 250 to monitor the custom resource using the custom controller 236 corresponding to the custom resource. The watch description describes one or more desired parameters to monitor for changes, and a threshold change to at least one of the parameters at which to take action. The watch description also includes one or more actions, i.e., a set of response instructions, to take in response to a detected change at the custom resource. For instance, the watch description may identify a threshold memory usage, and may flag the custom resource as unavailable in response to the custom resource exceeding the threshold memory usage.

The master 210 receives 320 change notifications based on the operational state of the monitored custom resource. For example, the host controller 250 may analyze timeseries data associated with the monitored custom resource. Upon detecting that a threshold change to a parameter of the custom resource is exceeded, the host controller 250 alerts the master 210.

In response to the host controller's 250 change notification, the master 210 initiates 330 a control sequence. The actions the master 210 takes in the control sequence may be delineated by the watch description.

The master 210 follows 340 the set of response instructions associated with the watch description. The response instructions may instruct the master 210 to send an email and/or instant message to the user regarding the changes to the custom resource. In some embodiments, the user receives the notifications regarding custom resource changes via a user interface managed by the management controller 211 of the node 200.

In some embodiments, the master 210 correlates and takes 350 related post-control actions. Post control actions may include monitoring and/or analysis of other custom resources. For example, a change to the monitored custom resource may indicate changes to other custom resources within the node 200. Accordingly, a change to the operational state of a custom resource can trigger other custom resource monitoring.

Dynamic and Automated Cloud Based Network CLI Rendering

Figure 4:
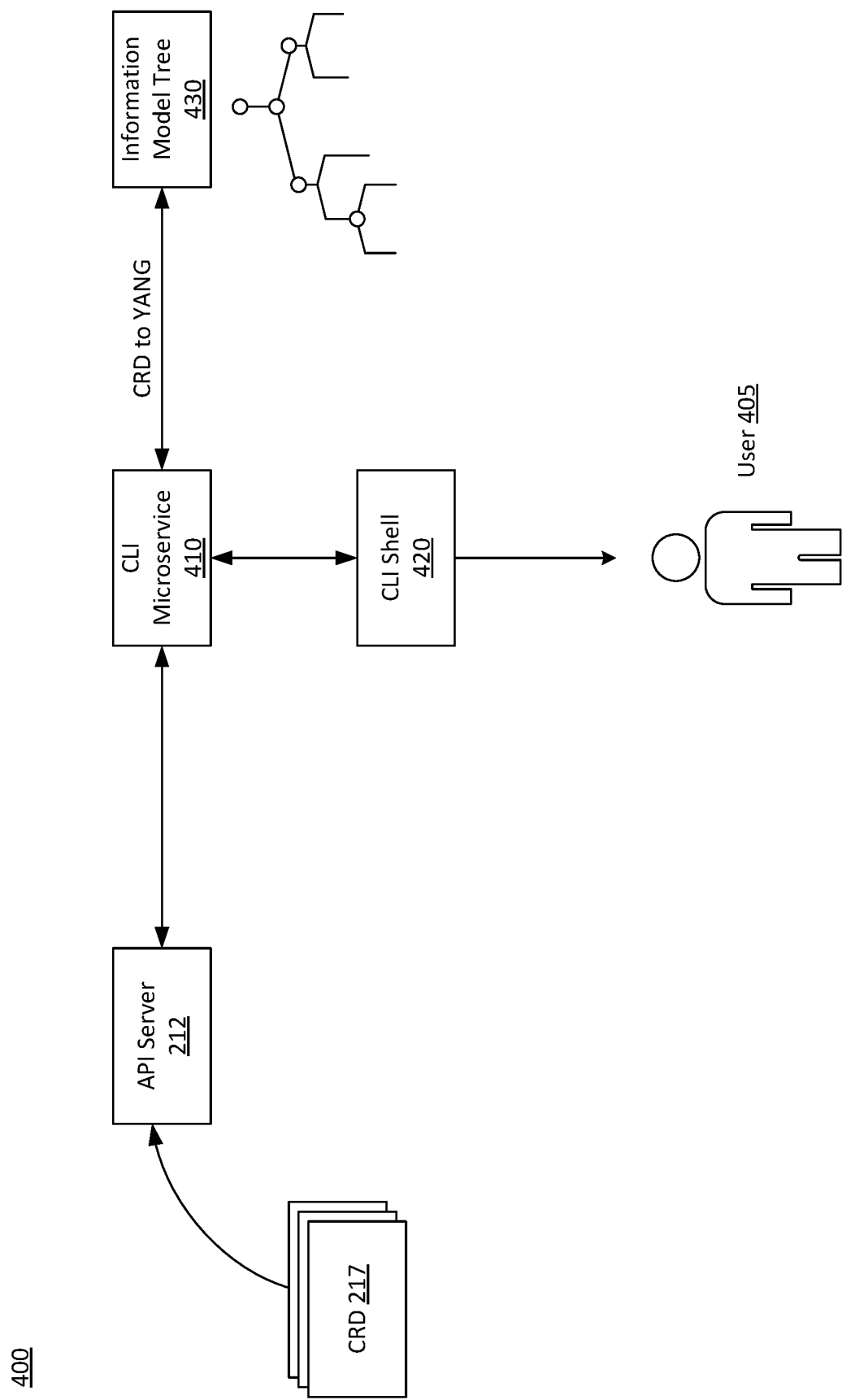
FIG. 4 illustrates an environment in which a user may interact with a cloud based network, in accordance with one or more embodiments.

FIG. 4 illustrates an environment 400 in which a user 405 may interact with a cloud based network 100, in accordance with one or more embodiments. The environment 400 includes one or more CRDs 217, the API server 212, a user 405, a CLI microservice 410, a user accessible command line interface (CLI) shell 420, and an information model tree 430.

The user 405 may be a cloud based network 100 operator who has access to a plurality of microservices within a node.

The CLI microservice 410 accesses the API server 212, renders the CLI shell 420, and generates, as well as maintains, the information model tree 430. The CLI microservice 410 is an embodiment of the microservices 245A-B in FIG. 2, but specifically configured to render the CLI shell 420. The CLI microservice 410 may translate the contents of the CRDs 217 into YANG format, as described more with respect to FIG. 5.

The CLI shell 420 renders CRDs 217 associated with microservices registered with the API server 212. The CLI shell 420 enables the user 405 to browse and access hierarchical objects (such as a simulated folder-file data structure) defined by one or more CRDs in a command line interface. The registered microservices may include the microservices 245A-B of the node 200. The management controller 210 of the node 200, described with respect to FIG. 2, may enable a user to access the CLI shell 420. In one embodiment, the user communicates and/or interfaces with the registered CRDs 217 via networking protocols defined and/or used by the API server 212 and/or the registered CRDs 217. In other embodiments, the CLI microservice 410 enables access to the registered CRDs 217 through a different networking interface than the CLI shell 420.

The information model tree 430 determines how the CLI shell 420 renders the CRDs 217. The information model tree 430 keeps track of relationships between a plurality of nodes, including the node 200, within the cloud based network 100, as well as structural information about the CRDs 217. In some embodiments, the information model tree 430 stores hierarchical information about the structure and content of the CRDs 217. The information model tree 430 dynamically updates with newly registered CRDs 217.

Figure 5:
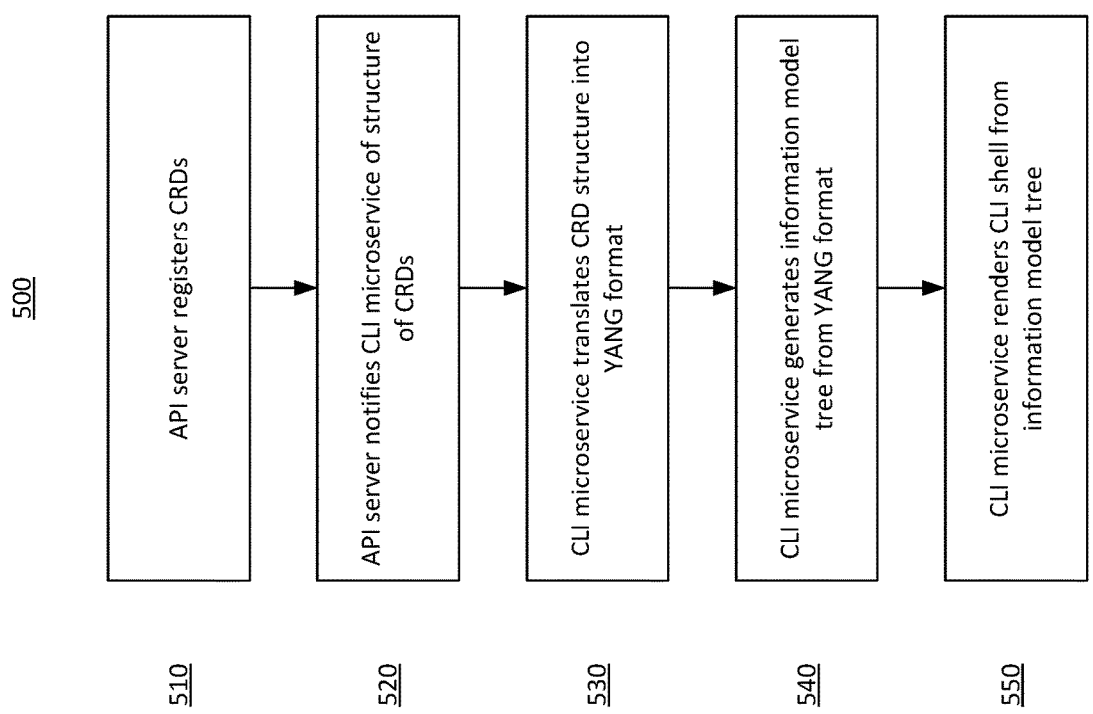
FIG. 5 illustrates a method for dynamically rendering a cloud based network command line interface, in accordance with one or more embodiments.

FIG. 5 illustrates a method 500 for dynamically rendering a cloud based network command line interface (CLI), in accordance with one or more embodiments. The dynamic rendering of cloud based network CLI occurs within the cloud based network 100, the node 200, and the system environment 400 shown in FIGS. 1, 2 and 4, respectively.

The API server 212 registers 510 one or more CRDs 217. The API server 212 may receive the CRDs from a client device, such as the client devices 150A-B, and/or the custom controller 236. In some embodiments, any controller, e.g., the resource controllers 235A-B, the host controller 250, within the node 200 may register a CRD 217 with the API server 212.

Upon registering at least one CRD 217, the API server 212 notifies 520 the CLI microservice 410. The notification includes the structure and content (or information describing the structure and content) of the registered CRDs 217.

The CLI microservice 410 translates 530 the CRD 217 structure into YANG or another suitable language used for accessing or representing network state information and configuration.

Using the YANG-formatted CRDs 217, the CLI microservice 410 generates 540 the information model tree 430. Alternatively, the CLI microservice 410 modifies and/or contributes to a pre-existing information model tree 430 corresponding to the requested CRDs 217, for instance by generating new information branches found in the YANG-formatted CRD 217 within the information model tree 430. In such instances, when the contents of the registered CRD 217 change, the API server 212 can propagate the change to the CLI microservice 410 (for instance, in real-time or immediately upon detecting the change), which can dynamically modify the information model tree 430 to reflect the changes to the registered CRD 217.

The API server 212 may also unregister a CRD 217 due to a non-functional or obsolete controller. In one embodiment, the API server 212 may unregister a CRD 217 after the user 405 uninstalls or no longer requires the use of the CRD 217's associated controller in the node 200 of the cloud based network 100. Once a CRD 217 is unregistered, the API server 212 notifies the CLI microservice 410. The CLI microservice 410 subsequently removes the data and structure associated with CRD 217 stored in the information model tree 430.

The CLI microservice 410 subsequently renders 550 the CLI shell 420 based on the information model tree 430. In some embodiment, the CLI microservice 410 causes a client device, e.g., one of the client devices 150A-B, to display a CLI, and the displayed interface can include a prompt enabling the user 405 to query and/or navigate the CLI. For instance, the user 405 can input text commands into the CLI shell 420 via a keyboard or other input mechanism to view the status of, configure, navigate, and/or modify objects within a network and its equipment. The user 405 can navigate to a folder storing objects each defining a networking communication protocol, and can view content/details of the protocol within the CLI shell 420. In some embodiments, the user 405 can access the API server 212 itself via the CLI shell 420.

The process illustrated by FIG. 5 may occur dynamically and in real time, such that the CLI microservice 410 does not need to generate a new information model tree 430 in response to a change in, or deregistration of, a CRD 217. Further, it should be noted that services that the API server 212 can register are not limited to those developed by the entity responsible for the operation of the disaggregated cloud based network 100. For instance, services with CRDs 217 initially unregistered with the API server 212 may be developed by a third-party, a community, or any other suitable external source. Once the API server 212 registers CRDs 217 originating from these services, the API server 212 may request the CLI microservice 410 to dynamically update the information model tree 430 to reflect the state of the CRDs 217 over time. Subsequently, a user 400 accessing the CLI shell 420 will be able to view the latest version of the CRD 217 data as reflected by the dynamically updated information model tree 430, without explicitly requiring the user to request that the information model tree be updated.

As discussed with respect to FIG. 2, the API server 212 may register new services over time, and the information model tree 430 may correspond to one or multiple CRDs 217. In some embodiments, the API server 212 requests the microservice 410 to provide information describing portions of the information model tree 430 corresponding to different CRDs 217, and subsequently combines the information describing the requested information model tree portions to create a new CRD (such as a compound or synthetic CRD). It should also be noted that in some embodiments, the CLI microservice 410 generates multiple information model trees 430, for instance one information model tree per CRD 217 registered or requested by the API server 212, one information model tree per service associated with the API server 212, and the like.

The API server 212 may be configured to notify the user 405 when the CLI microservice 410 updates the information model tree 430, which reflect changes to the operational state of the node 200 and/or the cloud based network 100. For instance, the user may opt to receive notifications when user-specified portions of the information model tree 430 are updated or generated, when user-specified CRDs are updated, when one or more actions or activities are performed within the network, when one or more objects within the information model tree are accessed, when user-specified entities access portions of the network, and/or when user-specified services access the API server 212 or the information model tree 430. In another embodiment, the API server 212 notifies the user 405 of changes in the organizational structure of the information model tree 430 displayed within the CLI shell 420, of objects within the information model tree 430 accessed via the CLI shell 420, or in response to any other suitable network change or activity.

Service Upgrades in a Cloud-Native Networking Environment

Figure 6:
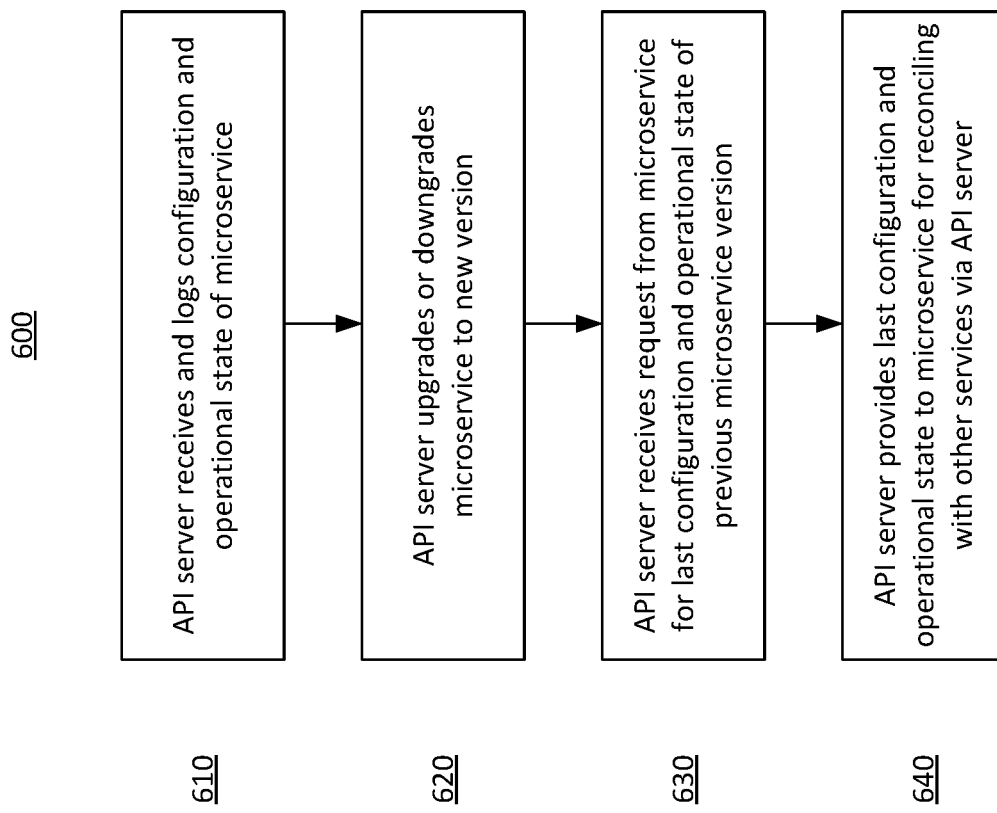
FIG. 6 illustrates a process for applying updates to microservices within a cloud based network, in accordance with one or more embodiments.

FIG. 6 illustrates a process 600 for applying updates to microservices within a cloud based network 100, in accordance with one or more embodiments. The process 600 enables the management of the lifecycle of network protocol services and applications implemented within the environment. The cloud based network 100 enables non-disruptive updates and reconciliation of network protocol services and applications, including microservices. Updates to microservices within a node, such as the microservices 245A-B of the node 200, may include upgrades or downgrades of microservice versions, capabilities, or functionalities. In some embodiments, the process 600 occurs across a plurality of microservices across a plurality of nodes (e.g., the nodes 120A-C, 121A-B).

A microservice within a node (e.g., the microservices 245A-B) includes models for the configuration state and operational state of the microservice, which are communicated to and registered with the API server within the node (e.g., the API server 212). The API server continually receives and logs 610 the configuration and operational states. In some embodiments, the API server accumulates or aggregates information describing the configuration states and operational states of the microservice. The API server may, for instance, store the states of the microservice within a database or other storage (e.g., the storage 216) accessible by the API server. In other embodiments, the API server itself directly manages the overall running state of the microservice, thereby enabling the API server to identify the operational state and the configuration state of the microservice immediately before applying an update to the microservice.

The API server identifies and applies 620 an update to the microservice. In one embodiment, the API server applies 620 an update to multiple services or controllers. Upon the application of the update, the microservice is updated from a first operating version to a second operating version. However, during the application of the update, the memory, the configuration state, and the operational state of the microservice may be reset or otherwise lost.

Thus, after being updated, the updated microservice service can request 630 the last configuration and operational states of the first operating version of the microservice from the API server.

In response, the API server accesses and provides 640 the requested last configuration and operational states to the updated microservice version (for instance, the API server can access the last configuration and operational states from a database, storage medium, or accumulation log within which the API server stored the last configuration and operational states before the update was applied). In some embodiments, the API server can provide the previous configuration and operational states upon the application of the update to the microservice (e.g., without an explicit request from the microservice).

Once the microservice has been updated, the API server can reconcile 640 the last configuration and operational states of the previous microservice version with other services implemented within the cloud based network 100 or in association with the API server. The reconciliation process can include checking if the last configuration and operational states are out of date or otherwise incompatible with other services. In the event that an incompatibility with other services is detected, the API server can refresh the configuration and operational states of the updated microservice to reconcile the incompatibility (for instance by identifying a new configuration or operational state in view of the requirements or parameters of the service with which the upgraded microservice is incompatible). The API server may notify a user (e.g., the user 405) when changes to other services occur, after which the user may explicitly or manually trigger the reconciliation process. Alternatively, the API server may be configured to automatically start the reconciliation process when changes, upgrades, downgrades, or modifications are applied to other services.

The API server can update and reconcile 640 microservices in a manner that avoids or minimizes disruption of the operation of or operation with the microservices. While applying an update to a microservice or reconciling the operational or configuration state of a microservice, the API server can allow the previous version of the microservice to go offline completely and can then subsequently initiate the new, updated microservice. The API server can enable the operation of a standby service to perform necessary functions of the offline microservice during the transition from the old version to the new version of the microservice. Alternatively, the API server can enable the initiation of the updated microservice while the previous version of the microservice is still operating. While both microservice versions are functional and online, the API server designates one as the standby service to perform necessary functions under the supervision of the other, fully functional service. The standby service enables the data plane (the parts of the network through which user traffic travels) to remain functional without disruptions.

In some embodiments, updates to services that depend on microservice may be held or delayed while the API server updates the microservice. These services may participate in the reconciliation process but may remain unchanged, and thereby undisrupted, during reconciliation.

Dynamic, Model-Driven Micrologging

Figure 7:
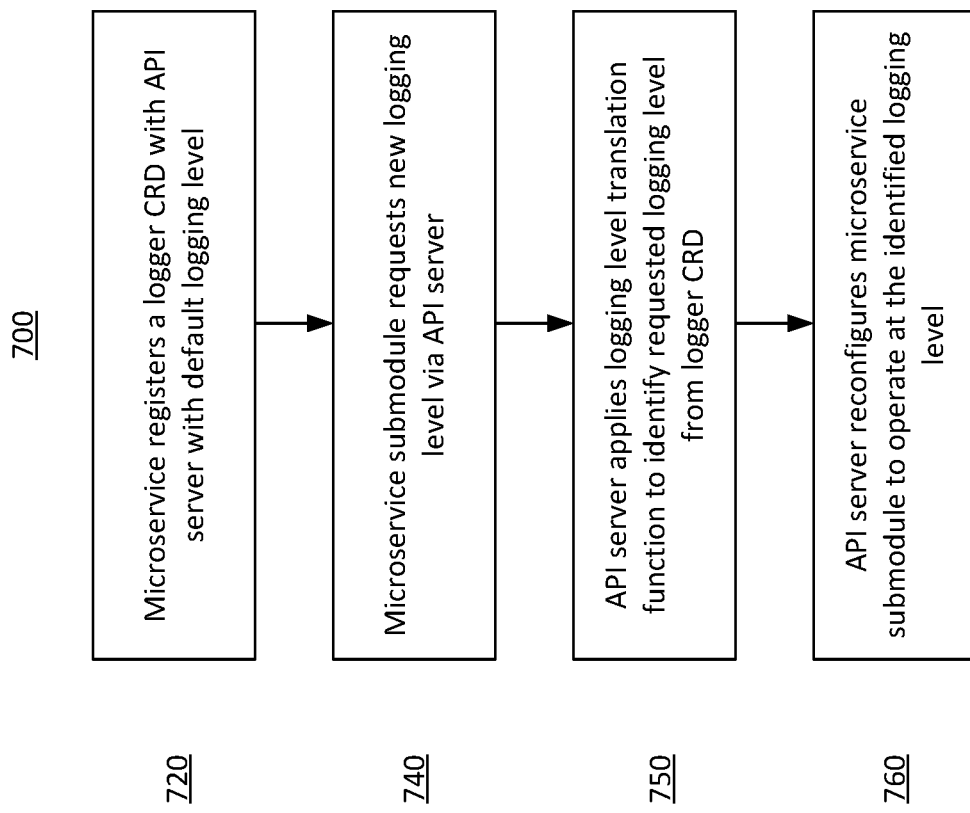
FIG. 7 illustrates a method for dynamic, model-driven micrologging within a cloud based network, in accordance with one or more embodiments.

FIG. 7 illustrates a method 700 for dynamic, model-driven micrologging within a cloud based network, in accordance with one or more embodiments. A user (e.g., the user 405) may want to specify logging levels for different submodules of a microservice (e.g., the microservices 245A-B).

The microservice registers 720 a logger CRD with a API server (e.g. the API server 212). The logger CRD may be an embodiment of the CRDs 217. The logger CRD includes the logger name, a default logging level, and definitions for each of a set of available logging levels. Each logging level specifies the verbosity or specificity with which events are logged. For example, active troubleshooting and debugging may require a logging level that captures more detail within logs produced by the logger. The registered logger CRDs can also include a list of functions that translate user or microservice requests to logging levels defined by the logger CRD. For example, a function in the logger CRD may specify that a user's request for a "debug" function or service is equivalent to a particular logging level defined by the logger CRD (e.g., "Logging level 3.2" or any suitable naming convention corresponding to a specific logging level).

Each submodule within a microservice may operate using a set, standard, or default logging level. During the operation of a particular submodule, a different submodule, a different service, or the user may require or request a different logging level than the default logging level, for instance in response to a desire to capture less or more information, in response to a change in security requirements, or to configure a set of submodules or services to operate at a uniform logging level.

In response to a request to change the logging level of a submodule, the submodule can query 740 the API server to obtain information about the requested logging level, for instance without disrupting service or functionality of the submodule.

The API server, in response to receiving a request for information about a requested logging level, can identify the requested logging level from the logger CRD. As noted above, the API server may apply a translation function to identify a logging level defined by the logger CRD mapped to the requested logging level.

Upon identifying the requested logging level, the API server can apply 750 the identified logging level to the requesting submodule by reconfiguring 760 the submodule to operate at the identified logging level. Additionally, the user can request that all submodules of the microservice inherit a global logging level, in response to which the API server can identify a logging level corresponding to the requested logging level and can configure all submodules of the microservice to operate at the identified logging level simultaneously or over a threshold period of time, beneficially guaranteeing all submodules within the microservice being logged at the identified logging level at or around the same time.

CLI Shell Templates for Relational Model Information Formatting and Display

Figure 8:
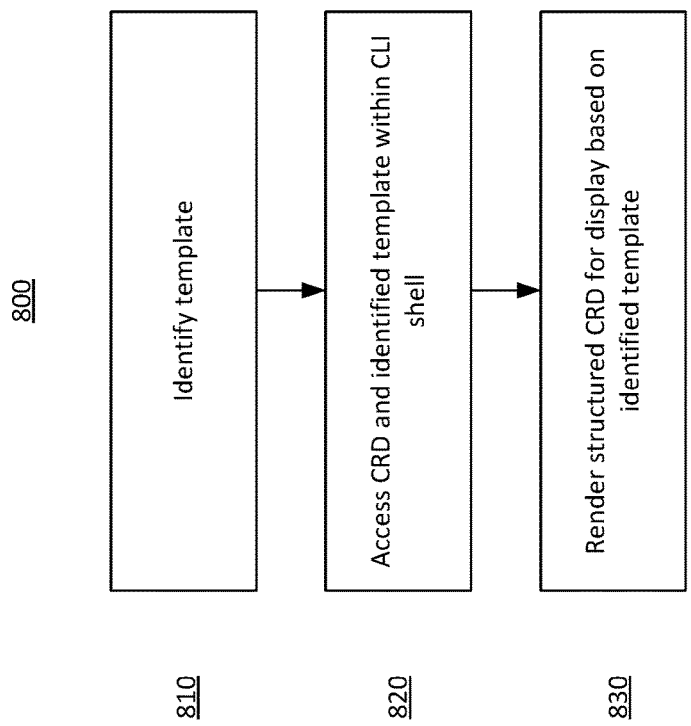
FIG. 8 illustrates a method for rendering a structured custom resource description (CRD) within a cloud based network, in accordance with one or more embodiments.

FIG. 8 illustrates a method 800 for rendering a structured custom resource description (CRD) within a cloud based network 100, in accordance with one or more embodiments. A user (e.g., the user 405) may want to customize the format of CRDs (e.g., the CRDs 217) displayed within a CLI shell (e.g., the CLI shell 420). In some embodiments, the user may access the CLI shell via a system environment such as the system environment 400 of FIG. 4. Prior to customization, the format of a CRD's contents are model and object driven, i.e., the format varies per CRD and CRO, and may not be structured in a way conducive to display to a human user. The user may want to standardize the format of displayed content across multiple CRDs and CROs. The standardized formatting of CRDs may capture relational constraints between CROs. The user can use CLI shell templates, stored and executed by a host controller of the node containing the CRDs (e.g., the host controller 250 of the node 200), to enable customized templating of a CRD's contents.

When executing the CLI shell templates, the user identifies a desired template to render the CRD 217. The template may be stored previously on the host controller, or in some embodiments, the user can write their own customized template. The template defines metadata that describes which and how CRD contents will be formatted when displayed. For example, the formatting metadata may specify the placement and arrangement of each CRO variable, and the spacing in between each variable. The template can further include one or more scripts that process CRD contents according to the formatting metadata, for instance by cyclically identifying each CRO variable within a CRD, and determining whether, how, and where to display the CRO variable.

The user accesses 820 the identified template and the CRD within the CLI shell. In some embodiments, the user may access multiple CRDs within the CLI shell, and can access one or more templates to format the accessed CRDs.

The host controller renders 830 the CRD based on the user's identified template, outputting a structured CRD for display within the CLI shell. The user may view and/or access the structured CRD through the CLI shell.

FIG. 9A illustrates a model driven output 900 of rendered CRDs without templating, in accordance with one or more embodiments. The model driven output 900 shows one or more CRDs 905, one or more CROs 910 associated with the CRDs, and a number of variables 915 associated with the CROs. The output 900 shows the contents of the two CRDs in particular (CRD 1 and CRD 2), three associated CROs (CRO A, CRO B, and CRO C), and three variables associated variables (VAR 1, VAR 2, and VAR3). In some embodiments, the model driven output 900 is shown via a CLI shell (e.g., the CLI shell 420) accessible by a user (e.g., the user 405).

FIG. 9B illustrates a templated output 950 of the CRDs shown in FIG. 9A, in accordance with one or more embodiments. A user (e.g., the user 405) identifies a template that defines the structure used to render the contents of the CRDs. The structure of the identified template of FIG. 9B identifies each CRD at a top center of a CRD portion of a display, and identifies each CRO associated with each CRD at the top of a column immediately under the identified CRO. Finally, the template identifies variables within each CRO within the column of the CRO and immediately below the identified CRO. Once a host controller of the node containing the CRDs (e.g., the host controller 250 of the node 200) renders the output 950, the CLI shell presents the formatted, structured CRD contents to the user (as illustrated in FIG. 9B). The output 950 may be rendered such that it reflects relational joins between multiple CRDs.

Figure 9C:
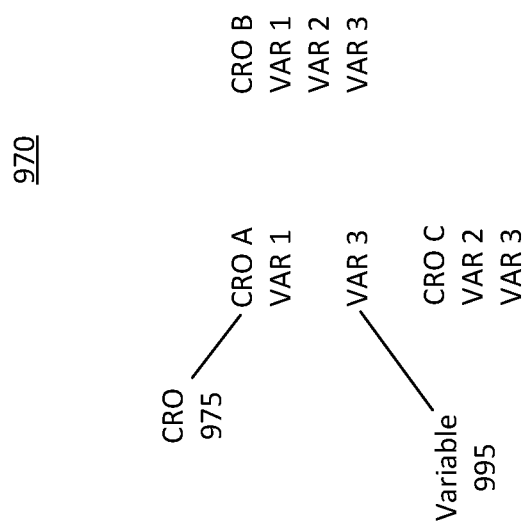
FIG. 9C illustrates a templated output of user defined CRDs, in accordance with one or more embodiments.

FIG. 9C illustrates a templated output 970 of user defined CRDs, in accordance with one or more embodiments. The new CRD may comprise a combination of multiple other CRDs, i.e., a compound or synthetic CRD, and/or components of one or more CRDs. The user can write and/or identify a template that determine the contents of the new CRD. The identified template may account for relational constraints between CRDs and CROs. In FIG. 9C, the new CRD 970 includes components of the CRDs shown in FIGS. 9A-B. The new CRD 970 includes CROs A, B, and C, and a number of variables 995 associated with each CRO. The variables included in the new CRD 970 are a subset of the variables 915 illustrated in FIGS. 9A-B.

It should be noted that although the templates described herein format CRD content based on CROs and variables within and associated with each CRD, in practice, any type of CRD object or data beyond CROs and variables can be defined and structured by a template according to the principles described herein.

Multi-Cluster Management and Control

Figure 10:
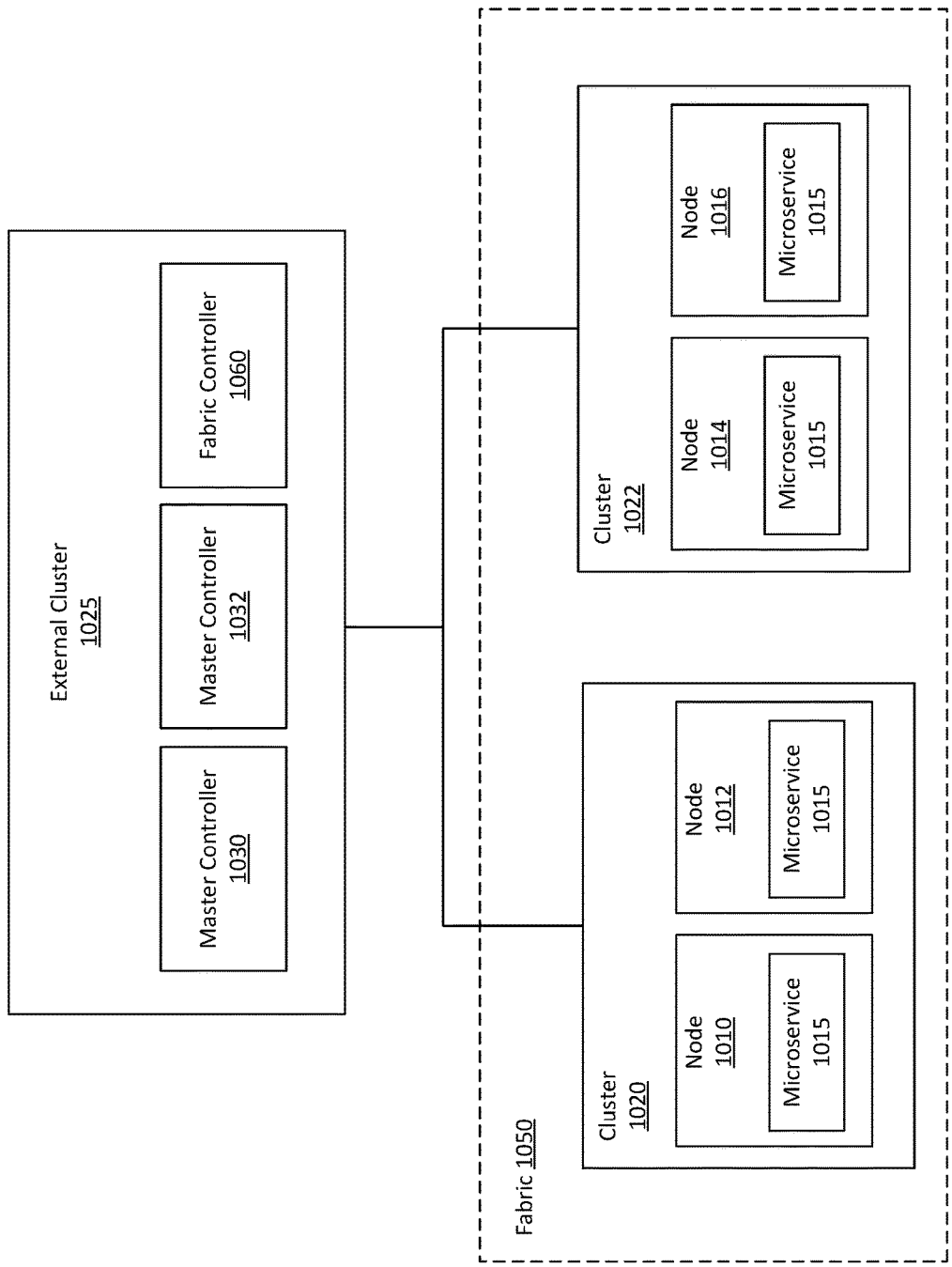
FIG. 10 illustrates a cloud based network with multiple network clusters, in accordance with one or more embodiments.

FIG. 10 illustrates a cloud based network 1000 with multiple network clusters 1020, 1022, 1025, in accordance with one or more embodiments. The cloud based network 1000 may be substantially similar to the cloud based network 100, while including the plurality of network clusters 1020, 1022, 1025. Each of the network clusters 1020, 1022, 1025 may be substantially similar to the distributed network cluster 110.

Each cluster includes one or more nodes 1010, 1012, 1014, 1016. Each node may be substantially similar to the nodes 120A-C, 121A-B and the node 200. For example, the cluster 1020 includes the node 1010 and the node 1012, and the cluster 1022 includes the node 1014 and the node 1016. Each node includes one or more microservices 1015. Each microservice 1015 is an embodiment of the microservices 245A-B of the node 200, described with respect to FIG. 2.

The network cluster 1025 may be an external cluster 1025 and include a plurality of master controllers, including a master controller 1030, a master controller 1032, as well as a fabric controller 1060. Similar to the cluster 1020, an external cluster 1025 can be implemented within or include one or more servers, for instance within a cloud service provider such as AWS. Each master controller monitors and controls the operational state of each of the clusters 1020, 1022. In particular, the master controller 1030 can be configured to control the cluster 1020 and the master controller 1032 can be configured to control the cluster 1022. Each master controller may be an embodiment of the master component 210. The multi-cluster cloud network environment 1000 may include more components than those described herein. For example, the cluster 1020 may include more than the two nodes 1010, 1012, and each node may include or implement a plurality of microservices beyond the microservice 1015.

The fabric controller 1060 monitors and controls the operation of each of the master controllers 1030 and 1032, thereby managing the clusters 1020 and 1022 across the fabric 1050. In some embodiments, the fabric 1050 may include more clusters than shown in FIG. 10. The system may include a plurality of fabric controllers 1060 which each assist with load balancing and handling requests from multiple clusters. In some embodiments, the one or more fabric controllers 1060 may be deployed outside the external cluster 1025.

In monitoring each of the master controllers 1030 and 1032, the fabric controller 1060 determines models running within the clusters 1020 and 1022. The models may correspond to API and/or CLI level CRDs. The fabric controller 1060 is configured to determine models that operate on a subset of the nodes, as well as models that operate across the fabric 1050. The models that operate across the fabric 1050 may be registered and operational at every node, at every cluster, of the fabric 1050. The fabric controller 1060 allows different versions of models to coexist. For example, a CRD operating within the cluster 1020 may be of a different version that the same CRD operating within the cluster 1022. The fabric controller 1060 may be configured, in such a case, to monitor and control both versions of the CRD across the clusters 1020 and 1022. The fabric controller 1060 also determines and stores the context in which models operate and the models' requirements for operation. For example, a particular configuration model stored by the fabric controller 1060 may be relevant to a node in the cluster 1020, but not to any nodes in the cluster 1022. The fabric controller 1060 may store such information about models being used throughout the fabric 1050 in a database coupled to the fabric controller 1060. Initially, the fabric controller 1060's database may be completely synchronized, but as changes occur within the fabric 1050, the fabric controller 1060 may only synchronize the content that has changed. Accordingly, the fabric controller 1060 may optimize for bandwidth usage.

The fabric controller 1060 may use CLI shell templates, such as those described with respect to FIGS. 9A-C, to describe and render relational model information. A user may be able to view, access, and customize, via the CLI shell, the models stored and controlled by the fabric controller 1060 (i.e., the models used within individual clusters and across the fabric 1050). The CLI shell for each individual node may have different formatting, different commands, and different modes of operation. The user may customize the templates of CLI shells rendered by the fabric controller 1060 for individual nodes, as well as across the fabric 1050, as described with respect to FIG. 8.

The user may use the CLI shell rendering of the models determined and stored by the fabric controller 1060 to analyze the operation and performance of nodes within the fabric 1050. The fabric controller 1060 also tracks the dynamic addition of new models as they are registered and executed on nodes. When a new model is registered on the node 1010 of the cluster 1020, for example, the fabric controller 1060 determines that a new model has been introduced and updates the CLI shell template accordingly. The fabric controller 1060 may determine when a new node joins the network and trends across nodes in the network. The fabric controller 1060 may correlate trends with actions taken by administrators of a node to determine intentions of the administrators. The fabric controller 1060 may identify discrepancies between nodes in the network, and may subsequently rectify the discrepancies and/or bring the discrepancies to the attention of a network administrator. Each of these trends and actions may be listed via the CLI shell template for user access.

The fabric controller 1060 may directly control operations on each of the nodes. Each node and/or cluster may grant the fabric controller 1060 permission to access and control the node directly. The fabric controller 1060 may execute microservices to run on the nodes and/or clusters. These microservices may include, among others, a fabric level CLI operator for rendering CLI shell templates a discussed above, an ethernet VPN operator, and a software lifecycle operator that automatically downgrades and/or upgrades model versions. The fabric controller 1060 may use each of these operators to directly control the nodes of the fabric 1050. Any updates implemented by the fabric controller 1060 to a node are reflected immediately at the node. Changes to a node (such as changes made by a node administrator or operator either simultaneous to or independent of changes implemented by the fabric controller 1060) are immediately reflected at the fabric controller 1060 level as well. For example, any changes to a configuration at the node 1010 would be recorded by the fabric controller 1060 in real time. Accordingly, the fabric controller 1060 and each individual node may each make modifications at the same time, enabling two-way synchronization.

The fabric controller 1060 may take user input on fabric-wide configuration instructions and translate the instructions such that they are implementable on each intended node. The user may provide fabric level configuration instructions to the fabric controller 1060, intending to implement the configuration across both the clusters 1020 and 1022 of the fabric 1050. The fabric controller 1060 may translate the configuration instructions for each cluster and each node, and configure each node as per the user's intent and as per the context of the node itself. For example, a user may provide instructions to the fabric controller 1060 to configure a virtual LAN (VLAN) on a subset of the nodes within the fabric 1050. Each of the nodes may operate with different versions of software, but the fabric controller 1060 can reconcile differences in software versions to ensure that the VLAN is configured across the intended nodes. The fabric controller 1060 may be able to fix any violations in the configuration at the node level. While the reconciliation logic for node level configuration violations may require user input, the fabric controller 1060 can determine the capabilities of each software version and configure each node based on their software version to implement the fabric wide configuration instructions.

Additional Considerations

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

It is to be understood that the Figures and descriptions have been simplified to illustrate elements that are relevant for a clear understanding of the present invention, while eliminating, for the purpose of clarity, many other elements found in a typical online system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the various embodiments. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A cloud based network including a plurality of nodes, each node comprising:
    a master controller;
    one or more custom controllers managed by the master controller, the one or more custom controllers configured to access and store custom resources, each custom resource including:
      an operational state of a node,
      a configuration state of the node, and
      a set of telemetry data representative of the node; and
    one or more containerized microservices managed by at least one of the custom controllers;
    wherein the plurality of nodes comprises a cluster;
    wherein the cluster comprises one of a plurality of clusters each comprising a corresponding set of nodes within the cloud based network; and
    wherein at least one cluster is an external cluster, the external cluster comprising:
      a plurality of master controllers, each master controller configured to manage a cluster of the plurality of clusters; and
      a fabric controller.

2. The cloud based network of claim 1, wherein at least one containerized microservice enables a performance of one or more intent-driven operations within the cloud based network.

3. The cloud based network of claim 1, wherein the plurality of nodes is managed by an external system.

4. The cloud based network of claim 1, the node further comprising:
    a host controller configured to instantiate the master controller and the custom controllers.

5. The cloud based network of claim 1, wherein data is stored external to the node and can be accessed on-demand.

6. The cloud based network of claim 5, wherein the master controller comprises an application programming interface (API) server, the master controller configured to establish a standard storage interface via the API server.

7. The cloud based network of claim 6, wherein the data stored external to the node is accessed by a custom controller via the standard storage interface.

8. The cloud based network of claim 1, wherein at least one custom controller is further configured to:
    receive, from the master controller:
      a desired operational state of the node, and
      a desired configuration state of the node;
    reconcile the operational state and the desired operational state of the node; and
    reconcile the configuration and the desired configuration of the node.

9. The cloud based network of claim 1, the master controller is further configured to:
    receive, from a microservice:
      an operational state of the microservice, and
      a configuration state of the microservice, the operational state and the configuration state associated with a current version of the microservice;
    provide, to the microservice:
      a second operational state of the microservice, and
      a second configuration state of the microservice, the second operational state and the second configuration state associated with a second version of the microservice; and
    reconcile the current version and the second version of the microservice with one or more other microservices.

10. The cloud based network of claim 1, wherein at least one containerized microservice is a command line interface (CLI) microservice configured to render the custom resources stored by the custom controllers for display to a node operator.

11. The cloud based network of claim 1, wherein the fabric controller is configured to:
    monitor each of the plurality of master controllers;
    manage each of the plurality of master controllers;
    access each of the plurality of nodes within each cluster; and
    manage each of the plurality of nodes within each cluster.

12. A method for managing a cloud based network comprising:
    generating and managing a plurality of nodes, each node comprising:
      a master controller;
      one or more custom controllers; and
      one or more containerized microservices; and
    wherein managing each of the nodes comprises:
      managing, by the master controller, the one or more custom controllers;
      managing, by at least one custom controller, the one or more containerized microservices; and
      accessing and storing custom resources, each custom resource comprising:
        an operational state of the node;
        a configuration state of the node; and
        a set of telemetry data representative of the node;
    wherein the plurality of nodes comprises a cluster;

wherein the cluster comprises one of a plurality of clusters each comprising a corresponding set of nodes within the cloud based network; and wherein at least one cluster is an external cluster, the external cluster comprising:

a plurality of master controllers, each master controller configured to manage a cluster of the plurality of clusters; and a fabric controller.

13. The method of claim 12, wherein at least one containerized microservice enables a performance of one or more intent-driven operations within the cloud based network.

14. The method of claim 12, wherein the plurality of nodes is managed by an external system.

15. The method of claim 12, wherein each node further comprises:

a host controller configured to instantiate the master controller and the custom controllers.

16. The method of claim 12, wherein at least one custom controller is configured to:

receive, from the master controller:
a desired operational state of the node, and
a desired configuration state of the node;

reconcile the operational state and the desired operational state of the node; and reconcile the configuration and the desired configuration of the node.

17. The method of claim 12, wherein the master controller is further configured to:

receive, from a microservice:
an operational state of the microservice, and
a configuration state of the microservice, the operational state and the configuration state associated with a current version of the microservice;

provide, to the microservice:
a second operational state of the microservice, and
a second configuration state of the microservice, the second operational state and the second configuration state associated with a second version of the microservice; and reconcile the current version and the second version of the microservice with one or more other microservices.

18. The method of claim 17, wherein at least one containerized microservice is a command line interface (CLI) microservice configured to render the custom resources stored by the custom controllers for display to a node operator.

* * * * *